(12) United States Patent
Ogasahara et al.

(10) Patent No.: US 11,982,472 B2
(45) Date of Patent: May 14, 2024

(54) MAGNETIC REFRIGERATION DEVICE

(71) Applicant: Mitsubishi Electric Corporation, Tokyo (JP)

(72) Inventors: Atsushi Ogasahara, Tokyo (JP); Shun Tonooka, Tokyo (JP); Tetsuya Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/927,744

(22) PCT Filed: Jul. 17, 2020

(86) PCT No.: PCT/JP2020/027867
§ 371 (c)(1),
(2) Date: Nov. 25, 2022

(87) PCT Pub. No.: WO2022/014044
PCT Pub. Date: Jan. 20, 2022

(65) Prior Publication Data
US 2023/0204262 A1 Jun. 29, 2023

(51) Int. Cl.
*F25B 21/00* (2006.01)
(52) U.S. Cl.
CPC ........ *F25B 21/00* (2013.01); *F25B 2321/002* (2013.01)
(58) Field of Classification Search
CPC .............. F25B 21/00; F25B 2321/002; F25B 2321/0023; Y02B 30/00
See application file for complete search history.

(56) References Cited

U.S. PATENT DOCUMENTS

| 3,746,084 A | 7/1973 | Ostbo |
| 2009/0217675 A1 | 9/2009 | Kobayashi et al. |
| 2011/0094718 A1 | 4/2011 | Yang |

(Continued)

FOREIGN PATENT DOCUMENTS

| CN | 1479061 A | * | 3/2004 | ............. F25B 21/00 |
| CN | 1479061 A | | 3/2004 | |

(Continued)

OTHER PUBLICATIONS

International Search Report and Written Opinion dated Oct. 6, 2020, received for PCT Application PCT/JP2020/027867, filed on Jul. 17, 2020, 11 pages including English Translation.

(Continued)

*Primary Examiner* — Ana M Vazquez
(74) *Attorney, Agent, or Firm* — XSENSUS LLP

(57) ABSTRACT

A magnetic refrigeration device includes a magnetic heat container, a magnetic field generation device, a high temperature-side heat exchanger, a low temperature-side heat exchanger, and a pump. The magnetic heat container is filled with a magneto-caloric material. The pump is capable of transporting a heat transport medium in a reciprocable manner between the high temperature-side heat exchanger and the low temperature-side heat exchanger via the magnetic heat container. The magnetic heat container has a spiral shape extending in a spiral on an identical plane and allows the heat transport medium transported by the pump to flow along the spiral shape.

9 Claims, 29 Drawing Sheets

(56) References Cited

U.S. PATENT DOCUMENTS

2019/0214173 A1     7/2019   Ramanujan et al.
2021/0183545 A1*   6/2021   Linares .................. H02K 1/276

FOREIGN PATENT DOCUMENTS

| | | | |
|---|---|---|---|
| CN | 101545732 | A | 9/2009 |
| JP | S51-16668 | B1 | 5/1976 |
| JP | S59-17316 | A | 1/1984 |
| JP | 2009-210165 | A | 9/2009 |
| JP | 2011-089762 | A | 5/2011 |
| JP | 2012-002388 | A | 1/2012 |
| JP | 2019-032116 | A | 2/2019 |
| JP | 2019-158209 | A | 9/2019 |
| JP | 2019158209 | A * | 9/2019 |

OTHER PUBLICATIONS

Decision to Grant dated Apr. 13, 2021, received for JP Application 2021-500131, 5 pages including English Translation.
Extended European Search Report dated Jul. 11, 2023 in European Patent Application No. 20945165.7, 7 pages.

* cited by examiner

MAGNETIC REFRIGERATION DEVICE

CROSS-REFERENCE TO RELATED APPLICATION

The present application is based on PCT filing PCT/JP2020/027867, filed Jul. 17, 2020, the entire contents of which are incorporated herein by reference.

TECHNICAL FIELD

The present disclosure relates to a magnetic refrigeration device.

BACKGROUND ART

A magnetic refrigeration device is a cooling and heating system using a magneto-caloric effect of a magneto-caloric material. Examples of the magnetic refrigeration device include a magnetic refrigeration device of an active magnetic regenerator (AMR) type. The AMR-type magnetic refrigeration device is a heat pump system that transports, using a heat transport medium, heat and cold generated from a magneto-caloric material due to a magneto-caloric effect by applying a varying magnetic field to the magneto-caloric material with which a magnetic heat container is filled, so as to increase a temperature in one side of the magnetic heat container and decreasing a temperature in the other side of the magnetic heat container. The active magnetic regenerator-type magnetic refrigeration device functions as a heat pump system capable of continuous operation by repeating a magnetic refrigeration cycle in which applying a varying magnetic field to the magneto-caloric material and heat transport using the heat transport medium are performed in cycles.

Such an AMR-type magnetic refrigeration device is disclosed in, for example, Japanese Patent Laying-Open No. 2009-210165 (PTL 1). The magnetic refrigeration device disclosed in PTL 1 includes a magnetic heat container having a spiral structure. Rotation of a magnetic field generation device disposed inside and outside the magnetic heat container having a spiral structure causes a magnetic field applied to a magneto-caloric material with which the magnetic heat container is filled to vary.

CITATION LIST

Patent Literature

PTL 1: Japanese Patent Laying-Open No. 2009-210165

SUMMARY OF INVENTION

Technical Problem

For an AMR-type magnetic refrigeration device, as a method for obtaining a high temperature difference between a high temperature side and a low temperature side of the magnetic heat container, there is a method by which a flow path of the magnetic heat container is made longer. For the AMR-type magnetic refrigeration device disclosed in PTL 1, however, when the flow path of the magnetic heat container is made longer, a dimension of the magnetic heat container increases in a direction in which a center axis of the spiral structure of the magnetic heat container extends. This makes the magnetic heat container larger in size.

The present disclosure has been made in view of the above-described problems, and it is therefore an object of the present disclosure to provide a magnetic refrigeration device capable of obtaining a high temperature difference between a high temperature side and a low temperature side of a magnetic heat container and allowing a reduction in size of the magnetic heat container.

Solution To Problem

A magnetic refrigeration device according to the present disclosure includes a magnetic heat container, a magnetic field generation device, a high temperature-side heat exchanger, a low temperature-side heat exchanger, and a pump. The magnetic heat container is filled with a magneto-caloric material. The magnetic field generation device is capable of varying a magnetic field applied to the magnetic heat container filled with the magneto-caloric material. The high temperature-side heat exchanger is connected to the magnetic heat container. The low temperature-side heat exchanger is connected to the magnetic heat container so as to place the magnetic heat container between the high temperature-side heat exchanger and the low temperature-side heat exchanger. The pump is capable of transporting a heat transport medium in a reciprocable manner between the high temperature-side heat exchanger and the low temperature-side heat exchanger via the magnetic heat container. The magnetic heat container has a spiral shape extending in a spiral on an identical plane and allows the heat transport medium transported by the pump to flow along the spiral shape.

Advantageous Effects of Invention

In the magnetic refrigeration device of the present disclosure, the magnetic field generation device is capable of varying a magnetic field applied to the magnetic heat container filled with the magneto-caloric material. The pump is capable of transporting the heat transport medium in a reciprocable manner between the high temperature-side heat exchanger and the low temperature-side heat exchanger via the magnetic heat container. The magnetic heat container has a spiral shape extending in a spiral on an identical plane and allows the heat transport medium transported by the pump to flow along the spiral shape. It is therefore possible to obtain a high temperature difference between the high temperature side and the low temperature side of the magnetic heat container and to reduce the size of the magnetic heat container.

DESCRIPTION OF EMBODIMENTS

Figure 1:
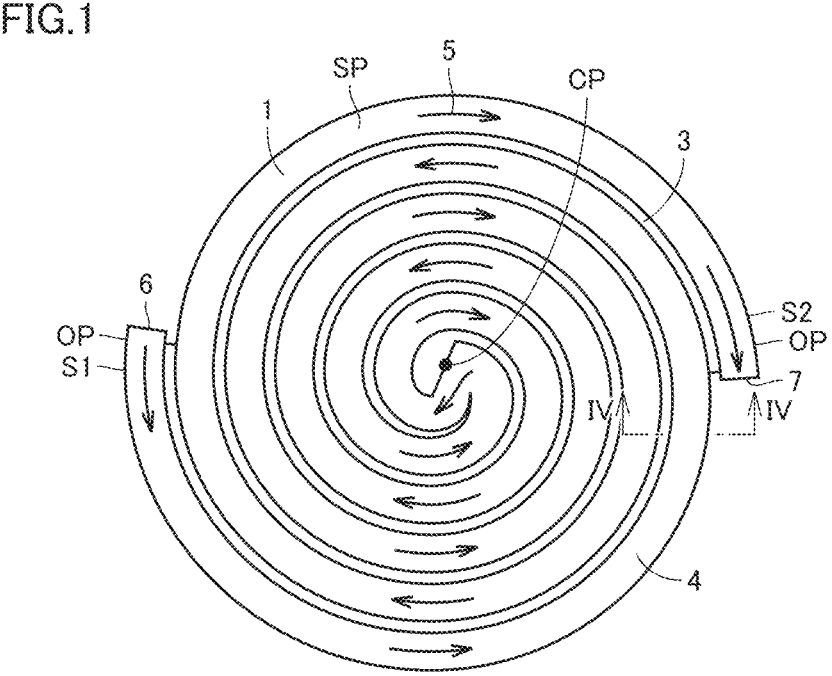
FIG. 1 is a schematic plan view of a configuration of a magnetic heat container according to a first embodiment.

Hereinafter, embodiments will be described with reference to the drawings. Note that, in the following description, the same or corresponding parts are denoted by the same reference numerals to avoid the description from being redundant.

First Embodiment

With reference to FIGS. 1 to 4, a configuration of a magnetic heat container 1 according to a first embodiment will be described. Magnetic heat container 1 according to the first embodiment is a magnetic heat container used in an active magnetic regenerator (AMR)-type magnetic refrigeration device.

Figure 2:
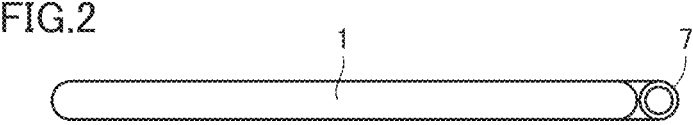
FIG. 2 is a schematic front view of the configuration of the magnetic heat container according to the first embodiment.
Figure 3:
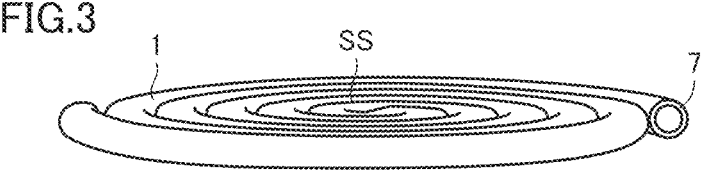
FIG. 3 is a schematic perspective view of the configuration of the magnetic heat container according to the first embodiment.

As illustrated in FIGS. 1 to 3, magnetic heat container 1 has a spiral shape SP. Magnetic heat container 1 may be entirely formed in a spiral shape. Spiral shape SP extends in a spiral on an identical plane. That is, spiral shape SP extends in a spiral on a virtual plane. It is preferable that spiral shape SP have the same width in its entirety in a direction (axial direction) in which a vortex axis extends.

Spiral shape SP includes a first spiral portion S1 and a second spiral portion S2. First spiral portion S1 extends in a spiral from an outer periphery of spiral shape SP to a center CP of spiral shape SP. Second spiral portion S2 extends in a spiral from center CP of spiral shape SP to the outer periphery of spiral shape SP. Second spiral portion S2 extends in a spiral in a direction opposite to a direction in which first spiral portion S1 extends. Center CP of spiral shape SP is disposed on the vortex axis.

In the present embodiment, magnetic heat container 1 is wound, in FIG. 1, in a spiral on the identical plane from the outer periphery to an inner periphery in a counterclockwise direction, and changes a winding direction from the counterclockwise direction to a clockwise direction at a vortex center to be wound in a spiral on the identical plane from the inner periphery to the outer periphery in the clockwise direction.

A high temperature-side port 6 is provided at a first end (one end) of magnetic heat container 1, and a low temperature-side port 7 is provided at a second end (the other end) of magnetic heat container 1. High temperature-side port 6 and low temperature-side port 7 are each located at an outer peripheral portion OP of spiral shape SP. High temperature-side port 6 and low temperature-side port 7 are connected to each other through magnetic heat container 1.

Figure 4:
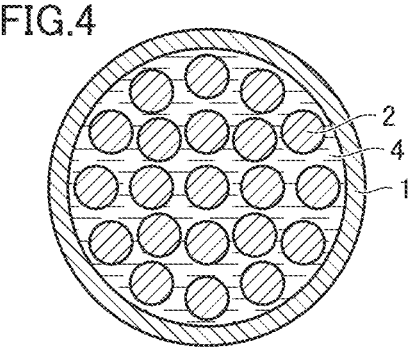
FIG. 4 is a cross-sectional view taken along line IV-IV in FIG. 1.

As illustrated in FIGS. 1 and 4, magnetic heat container 1 is formed in a tubular shape. An internal space is provided inside magnetic heat container 1. Magnetic heat container 1 is filled with a magneto-caloric material 2. Magneto-caloric material 2 has a magneto-caloric effect. Magnetic heat container 1 is further filled with a heat transport medium. A heat transport medium 4 fills a gap of magneto-caloric material 2 inside magnetic heat container 1. Heat transport medium 4 transports heat generated from the magneto-caloric material. Heat transport medium 4 is freely movable along spiral shape SP in a direction of a flow 5 of heat transport medium 4 and a direction opposite to flow 5.

On the other hand, it is desirable that magneto-caloric material 2 do not largely move through magnetic heat container 1 due to flow 5 of heat transport medium 4. Therefore, magneto-caloric material 2 densely fills magnetic heat container 1. Alternatively, magneto-caloric material 2 is fixed in magnetic heat container 1. It is further desirable that magneto-caloric material 2 be equally distributed along a flow path in magnetic heat container 1. Therefore, magneto-caloric material 2 is disposed on the flow path in magnetic heat container 1 so as to reduce a section where magneto-caloric material 2 is less dense. Here, magneto-caloric materials 2 having different properties may be disposed along the flow path in magnetic heat container 1. The different properties mean, for example, temperature dependence of entropy change due to the magneto-caloric effect, specific heat, and material composition.

Magnetic heat container 1 has a structure where portions remote from each other of magnetic heat container 1 in the flow path of spiral shape SP of magnetic heat container 1 are adjacent to each other. A heat insulating member 3 is disposed between portions adjacent to each other due to spiral shape SP of magnetic heat container 1. Heat insulating member 3 is disposed between the adjacent portions of spiral shape SP. Heat insulating member 3 prevents heat from transferring to a different adjacent portion due to spiral shape SP of magnetic heat container 1. As an alternative to heat insulating member 3, a wall surface of magnetic heat container 1 may be formed of a heat insulating material. In this case, the adjacent portions of spiral shape SP are formed of the heat insulating material. The heat insulating material is, for example, a general waterproof heat insulating member that functions as a pipe. During magnetic refrigeration, a temperature gradient from high temperature-side port 6 toward low temperature-side port 7 is generated along the flow path in magnetic heat container 1. Heat insulating member 3 disposed between vortices of magnetic heat container 1 prevents heat conduction via a short-circuit in the flow path, so that high performance can be obtained even with spiral shape SP. Even when the adjacent portions of spiral shape SP are formed of the heat insulating material, high performance can be obtained even with spiral shape SP by preventing heat conduction via a short-circuit in the flow path.

Figure 5:
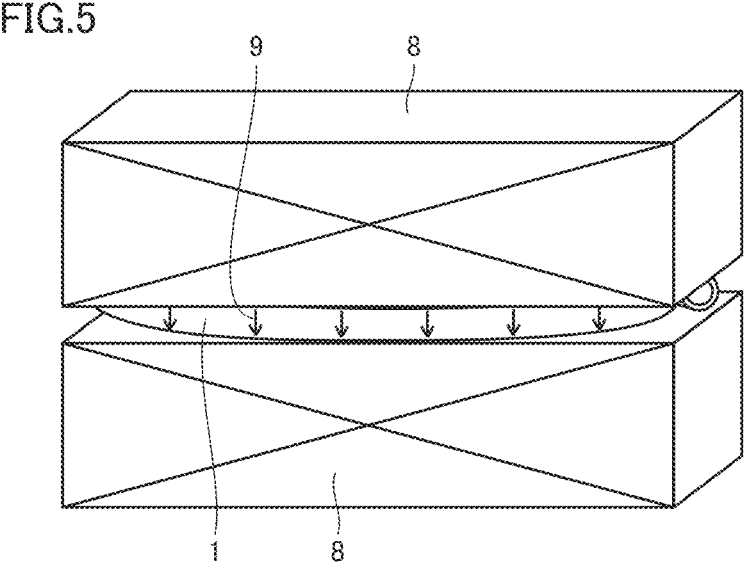
FIG. 5 is a schematic perspective view of a configuration of the magnetic heat container and a magnetic field generation device according to the first embodiment.

With reference to FIGS. 3 to 5, a configuration of magnetic heat container 1 and a magnetic field generation device 8 according to the first embodiment will be described.

Magnetic field generation device 8 is disposed to face a spiral surface SS of magnetic heat container 1. Magnetic field generation device 8 is disposed to cover all magnetic heat container 1. Magnetic field generation device 8 is capable of varying a magnetic field applied to magnetic heat container 1 filled with magneto-caloric material 2.

Magnetic field generation device 8 applies a relatively strong magnetic field to magneto-caloric material 2 by causing a uniform magnetic field 9 to pass through magnetic heat container 1 in a direction orthogonal to spiral surface SS. In order to apply a varying magnetic field to magneto-caloric material 2, there is a method by which magnetic field generation device 8 is moved by a permanent magnet horizontally relative to magnetic heat container 1 so as to place magnetic heat container 1 out of a magnetic field generation region of magnetic field generation device 8. There is another method by which magnetic field generation device 8 formed of an electromagnet varies the intensity of the magnetic field using a current of the electromagnet.

In AMR-type magnetic refrigeration, it is possible to extract a large amount of heat (cold) from magneto-caloric material 2 by uniformly applying a varying magnetic field to all magneto-caloric material 2 in magnetic heat container 1. For example, when a part of magneto-caloric material 2 is small in variation in magnetic field, the amount of heat (cold) generation due to the magneto-caloric effect of magneto-caloric material 2 in the part becomes small, and the part becomes a bottleneck in heat transport of magnetic refrigeration accordingly. This prevents sufficient performance from being exhibited.

Figure 6:
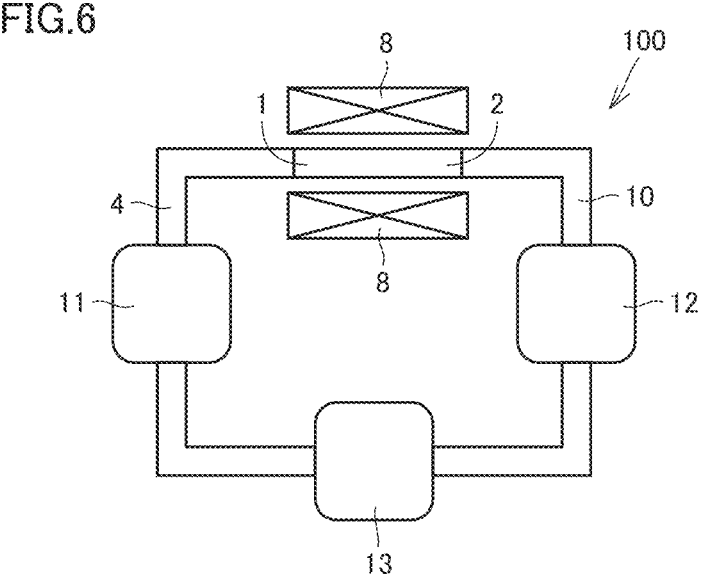
FIG. 6 is a schematic plan view of a configuration of a magnetic refrigeration device according to the first embodiment.

With reference to FIGS. 1 and 6, a configuration of a magnetic refrigeration device 100 according to the first embodiment will be described.

Magnetic refrigeration device 100 according to the first embodiment includes magnetic heat container 1, heat insulating member 3, magnetic field generation device 8, and a heat transport path 10. Heat transport path 10 includes a high temperature-side heat exchanger 11, a low temperature-side heat exchanger 12. and a pump 13.

High temperature-side port 6 and low temperature-side port 7 of magnetic heat container 1 are each connected to heat transport path 10. High temperature-side heat exchanger 11 is included in heat transport path 10 connected to high temperature-side port 6. High temperature-side heat exchanger 11 is connected to magnetic heat container 1. Low temperature-side heat exchanger 12 is included in heat transport path 10 connected to low temperature-side port 7. Low temperature-side heat exchanger 12 is connected to magnetic heat container 1 so as to place magnetic heat container 1 between high temperature-side heat exchanger 11 and low temperature-side heat exchanger 12.

A high temperature side and a low temperature side of heat transport path 10 are commonly connected to pump 13. Heat transport path 10 is filled with heat transport medium 4. Pump 13 is capable of transporting heat transport medium 4 in a reciprocable manner between high temperature-side heat exchanger 11 and low temperature-side heat exchanger 12 via magnetic heat container 1. Magnetic heat container 1 allows heat transport medium 4 transported by pump 13 to flow along spiral shape SP. Pump 13 is a reciprocating pump.

With reference to FIGS. 5 and 6, how magnetic refrigeration device 100 according to the first embodiment operates will be described.

How magnetic refrigeration device 100 operates will be described with a state where a relatively strong magnetic field is passed through magnetic heat container 1 by magnetic field generation device 8 as a starting point.

Moving or controlling magnetic field generation device 8 changes the state where a relatively strong magnetic field passes through magnetic heat container 1 to a state where magnetic field 9 that is relatively weak passes throughout magnetic heat container 1. At this time, magneto-caloric material 2 in magnetic heat container 1 generates cold due to the magneto-caloric effect caused by a decrease in magnetic field passing through magneto-caloric material 2. That is, magneto-caloric material 2 absorbs heat due to a decrease in intensity of the magnetic field applied to magneto-caloric material 2. The cold from magneto-caloric material 2 is conducted to heat transport medium 4 adjacent to magneto-caloric material 2.

Heat transport medium 4 in heat transport path 10 and magnetic heat container 1 is transported from high temperature-side heat exchanger 11 to low temperature-side heat exchanger 12 via magnetic heat container 1 by pump 13, so as to cause heat transport medium 4 to transport cold from magneto-caloric material 2 to low temperature-side heat exchanger 12. On the other hand, since heat transport medium 4 adjacent to magneto-caloric material 2 has flowed in from high temperature-side port 6, heat transport medium 4 is relatively high in temperature as compared with heat transport medium 4 to which cold is applied in the previous step.

Next, moving or controlling magnetic field generation device 8 changes the state where a relatively weak magnetic field passes through magnetic heat container 1 to the state where magnetic field 9 that is relatively strong passes through magnetic heat container 1. At this time, magneto-caloric material 2 in magnetic heat container 1 generates heat due to the magneto-caloric effect caused by an increase in magnetic field passing through magneto-caloric material 2. That is, magneto-caloric material 2 generates heat due to an increase in intensity of the magnetic field applied to magneto-caloric material 2. The heat from magneto-caloric material 2 is conducted to heat transport medium 4 adjacent to magneto-caloric material 2.

Heat transport medium 4 in heat transport path 10 and magnetic heat container 1 is transported from low temperature-side heat exchanger 12 to high temperature-side heat exchanger 11 via magnetic heat container 1 by pump 13, so as to cause heat transport medium 4 to transport heat from magneto-caloric material 2 to high temperature-side heat exchanger 11. On the other hand, since heat transport medium 4 adjacent to magneto-caloric material 2 has flowed in from low temperature-side port 7, heat transport medium 4 is relatively low in temperature as compared with heat transport medium 4 to which heat is applied in the previous step.

Repeating the above-described steps achieves a magnetic refrigeration cycle in which cold is transported to low temperature-side heat exchanger 12 and heat is transported to high temperature-side heat exchanger 11.

It is possible to generate, on the basis of the temperature gradient generated in the magnetic refrigeration cycle, a large temperature gradient by further performing the magnetic refrigeration cycle. As the magnetic refrigeration cycle is repeated, heat is transported to magneto-caloric materials 2 adjacent to each other along the flow path inside magnetic heat container 1, and a temperature gradient is also generated inside magnetic heat container 1.

Repeating the magnetic refrigeration cycle at a high speed allows an increase in performance per unit time of magnetic refrigeration. For this purpose, it is desirable to increase a transport speed of heat transport medium 4. A filling density of magneto-caloric material 2 with which magnetic heat container 1 is filled is generally high, so that pressure loss relative to force of pump 13 for transporting heat transport medium 4 becomes large. Pump 13 having a capacity determined with the pressure loss taken into account is required.

When a bent portion exists in magnetic heat container 1 as a factor in pressure loss relative to the force of pump 13, pressure loss that prevents heat transport medium 4 from smoothly flowing occurs at the bent portion, and it is therefore desirable that the number of bent portions be small. In magnetic heat container 1 of the first embodiment, spiral shape SP has a circular shape, so that the bent portion is gentle in bending angle. Further, spiral shape SP may have a quadrangular shape. Even when spiral shape SP has a quadrangular shape, it is sufficient that a flow path direction changes by 90 degrees at each bent portion. For this reason, even when the spiral shape has a quadrangular shape, it is possible to design the bent portion so as to have a gentle bending angle from the viewpoint of pressure loss.

The operation and effect of magnetic refrigeration device 100 according to the first embodiment will be described.

With reference to FIGS. 1 and 6, in magnetic refrigeration device 100 according to the first embodiment, magnetic field generation device 8 is capable of varying the magnetic field applied to magnetic heat container 1 filled with magneto-caloric material 2. Pump 13 is capable of transporting heat transport medium 4 in a reciprocable manner between high temperature-side heat exchanger 11 and low temperature-side heat exchanger 12 via magnetic heat container 1. Therefore, the use of the AMR type allows a high temperature difference to be obtained between the high temperature side and the low temperature side of magnetic heat container 1. Further, magnetic heat container 1 has spiral shape SP extending in a spiral on the identical plane and allows the heat transport medium transported by pump 13 to flow along spiral shape SP. Therefore, magnetic heat container 1 can be reduced in dimension in the direction in which the vortex axis of spiral shape SP extends. This allows a reduction in size of magnetic heat container 1. This in turn allows a high temperature difference to be obtained between the high temperature side and the low temperature side of magnetic heat container 1, and allows a reduction in size of magnetic heat container 1. Further, since magnetic heat container 1 can be reduced in size, magnetic refrigeration device 100 including magnetic heat container 1 can be reduced in size.

Further, since magnetic heat container 1 has spiral shape SP, it is possible to increase a volume of magnetic heat container 1 that uniformly applies a varying magnetic field with one magnetic field variation region while suppressing an increase in pressure loss of heat transport medium 4 flowing in magnetic heat container 1. Further, magnetic heat container 1 is simple in structure as compared with magnetic heat container 1 having segmented magnetic field variation regions.

In magnetic refrigeration device 100 according to the first embodiment, heat insulating member 3 is disposed between adjacent portions of spiral shape SP. This allows heat insulating member 3 to reduce heat transfer between the adjacent portions of spiral shape SP of magnetic heat container 1.

In magnetic refrigeration device 100 according to the first embodiment, the adjacent portions of spiral shape SP are formed of a heat insulating material. This allows the heat insulating material to reduce heat transfer between the adjacent portions of spiral shape SP of magnetic heat container 1.

In magnetic refrigeration device 100 according to the first embodiment, spiral shape SP includes first spiral portion S1 extending in a spiral from the outer periphery of spiral shape SP to the center of spiral shape SP and second spiral portion S2 extending in a spiral from the center of spiral shape SP to the outer periphery of spiral shape SP. Second spiral portion S2 extends in a spiral in a direction opposite to a direction in which first spiral portion S1 extends. This causes pipe ports (high temperature-side port 6 and low temperature-side port 7) of magnetic heat container 1 to be positioned at outer peripheral portions OP of spiral shape SP, thereby allowing the pipe ports (high temperature-side port 6 and low temperature-side port 7) of magnetic heat container 1 to be easily connected to heat transport path 10.

Second Embodiment

A magnetic heat container 1 and a magnetic refrigeration device 100 according to a second embodiment are the same in configuration, operation, and effect as magnetic heat container 1 and magnetic refrigeration device 100 according to the first embodiment unless otherwise specified.

Figure 7:
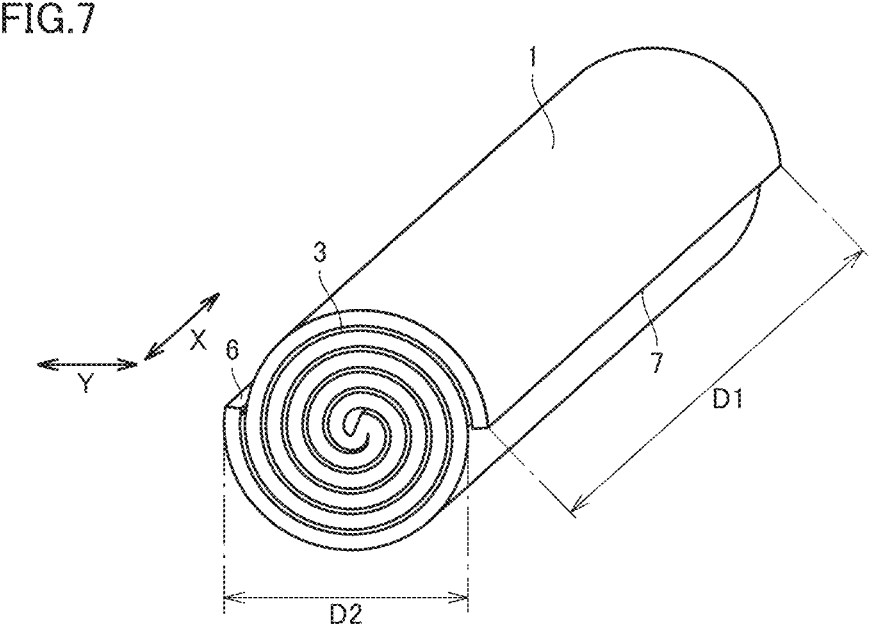
FIG. 7 is a schematic perspective view of a configuration of a magnetic heat container according to a second embodiment.

With reference to FIG. 7, a configuration of magnetic heat container 1 according to the second embodiment will be described.

Magnetic heat container 1 according to the second embodiment is larger in width of a spiral shape SP in an axial direction X than a width of spiral shape SP in a direction Y orthogonal to axial direction X. Magnetic heat container 1 has a first dimension D1 in axial direction X of spiral shape SP and a second dimension D2 in direction Y orthogonal to axial direction X. First dimension D1 is greater than second dimension D2. This allows an increase in volume of magnetic heat container 1 in axial direction X. Therefore, magnetic heat container 1 can be designed to contain a large amount of magneto-caloric material 2.

Figure 8:
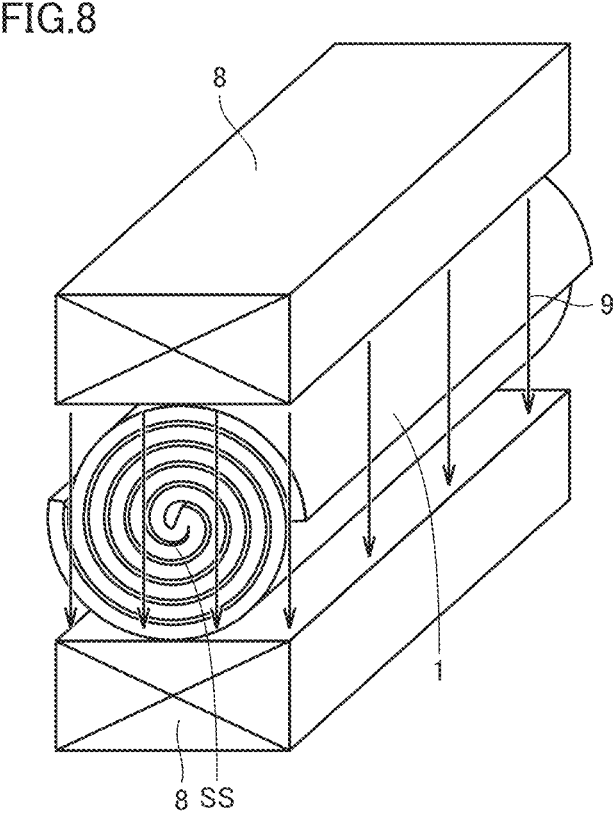
FIG. 8 is a schematic perspective view of a configuration of the magnetic heat container and a magnetic field generation device according to the second embodiment.

With reference to FIG. 8, a configuration of magnetic heat container 1 and a magnetic field generation device 8 according to the second embodiment will be described.

Since spiral shape SP of magnetic heat container 1 is longer in axial direction X, it may be desirable in design that magnetic field generation device 8 be disposed such that an application direction of a magnetic field 9 is parallel to a spiral surface SS of magnetic heat container 1. Magnetic field generation device 8 applies magnetic field 9 to magnetic heat container 1 in a direction parallel to spiral surface SS. Spiral surface SS of magnetic heat container 1 is a plane on which spiral shape SP is spiral. Neither a high temperature-side port 6 nor a low temperature-side port 7 of magnetic heat container 1 comes into contact with magnetic field generation device 8. That is, high temperature-side port 6 and low temperature-side port 7 of magnetic heat container 1 are both connected to a heat transport path 10 without being obstructed by magnetic field generation device 8.

Figure 9:
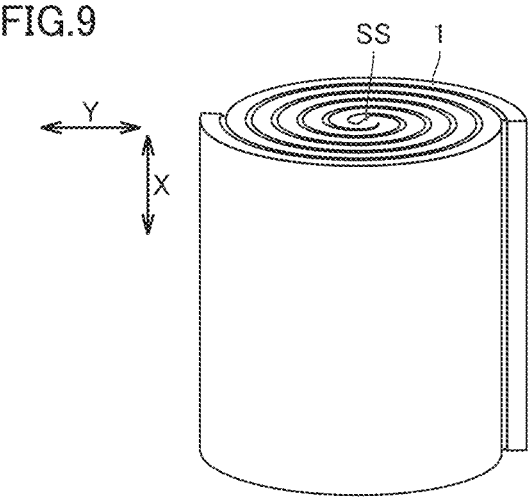
FIG. 9 is a schematic perspective view of a configuration of a modification of the magnetic heat container according to the second embodiment.

With reference to FIG. 9, a configuration of a modification of magnetic heat container 1 according to the second embodiment will be described. In the modification of magnetic heat container 1 according to the second embodiment, spiral surface SS of magnetic heat container 1 is different in orientation from spiral surface SS of magnetic heat container 1 illustrated in FIG. 7.

Figure 10:
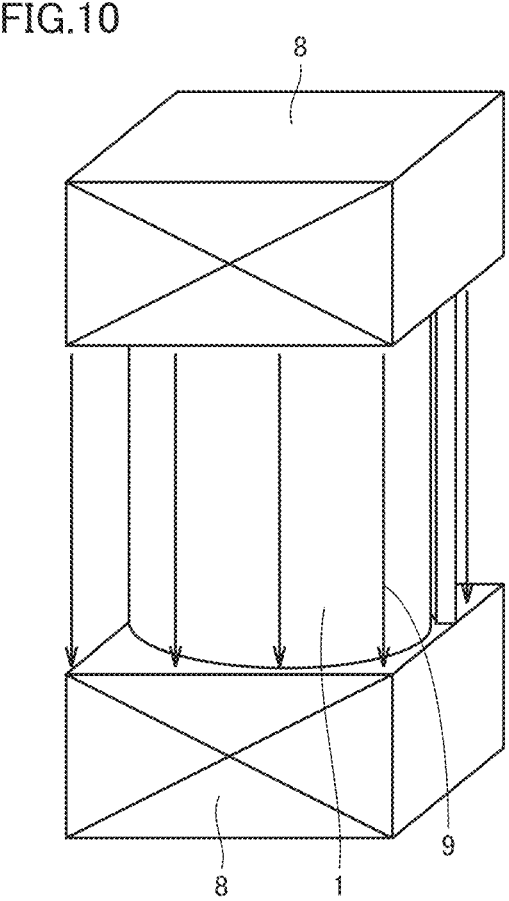
FIG. 10 is a schematic perspective view of a configuration of a modification of the magnetic heat container and the magnetic field generation device according to the second embodiment.

With reference to FIGS. 9 and 10, a configuration of a modification of magnetic heat container 1 and magnetic field generation device 8 according to the second embodiment will be described. In the modification of magnetic heat container 1 and magnetic field generation device 8 according to the second embodiment, magnetic field generation device 8 is disposed to face spiral surface SS of magnetic heat container 1.

As illustrated in the modification of magnetic heat container 1 and magnetic field generation device 8 according to the second embodiment, as with the first embodiment, magnetic field generation device 8 can also apply magnetic field 9 to magnetic heat container 1 in a direction orthogonal to spiral surface SS. Magnetic field generation device 8 applies magnetic field 9 to magnetic heat container 1 in a direction orthogonal to spiral surface SS. In the modification of magnetic heat container 1 and magnetic field generation device 8 according to the second embodiment, neither high temperature-side port 6 nor low temperature-side port 7 of magnetic heat container 1 comes into contact with magnetic field generation device 8.

The operation and effect of magnetic refrigeration device 100 according to the second embodiment will be described.

In magnetic refrigeration device 100 according to the second embodiment, first dimension D1 of spiral shape SP in axial direction X is greater than second dimension D2 in direction Y orthogonal to axial direction X. This allows an increase in volume of magnetic heat container 1 in axial direction X. This accordingly allows an increase in amount of magneto-caloric material 2 with which magnetic heat container 1 is filled. This in turn allows an increase in performance of magnetic refrigeration device 100. Even in this case, magnetic heat container 1 can be reduced in size as compared with a magnetic heat container having a spiral structure with a flow path having the same length.

In magnetic refrigeration device 100 according to the second embodiment, magnetic field generation device 8 applies a magnetic field to magnetic heat container 1 in a direction parallel or orthogonal to spiral surface SS. This allows an increase in degree of freedom in design of magnetic heat container 1 and magnetic field generation device 8.

Third Embodiment

A magnetic heat container 1 and a magnetic refrigeration device 100 according to a third embodiment are the same in configuration, operation, and effect as magnetic heat container 1 and magnetic refrigeration device 100 according to the first embodiment unless otherwise specified.

Figure 11:
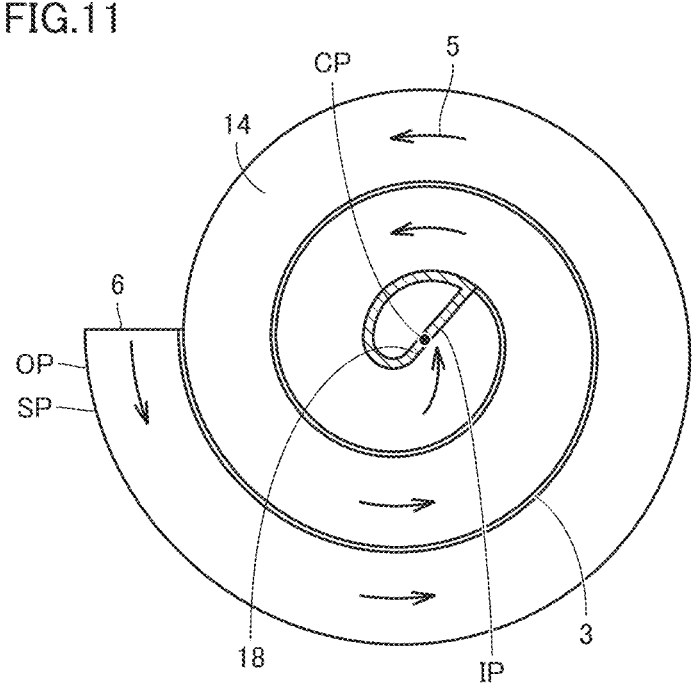
FIG. 11 is a schematic top view of a configuration of a first layer of a magnetic heat container according to a third embodiment.
Figure 12:
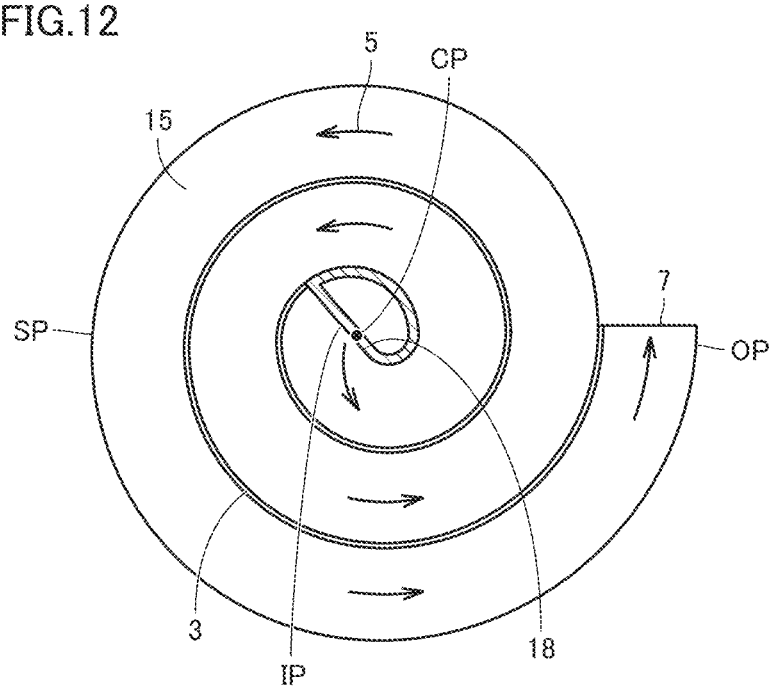
FIG. 12 is a schematic bottom view of a configuration of a second layer of the magnetic heat container according to the third embodiment.
Figure 13:
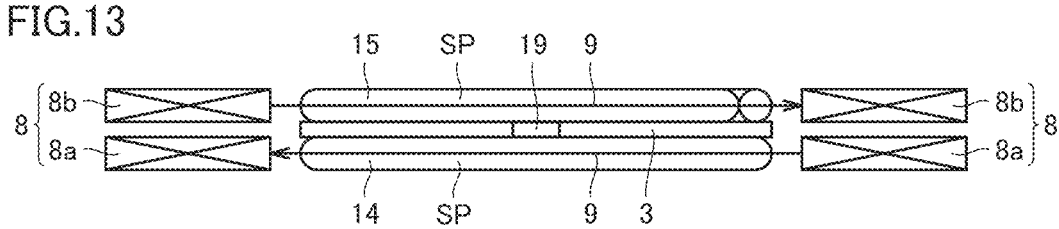
FIG. 13 is a schematic front view of a configuration of the magnetic heat container and a magnetic field generation device according to the third embodiment.
Figure 14:
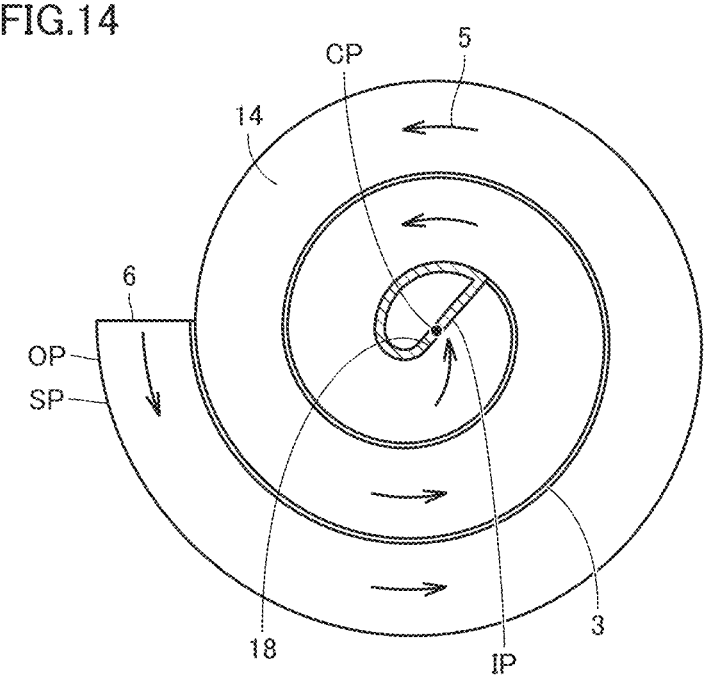
FIG. 14 is a schematic top view of a configuration of a first layer of a magnetic heat container according to a fourth embodiment.
Figure 15:
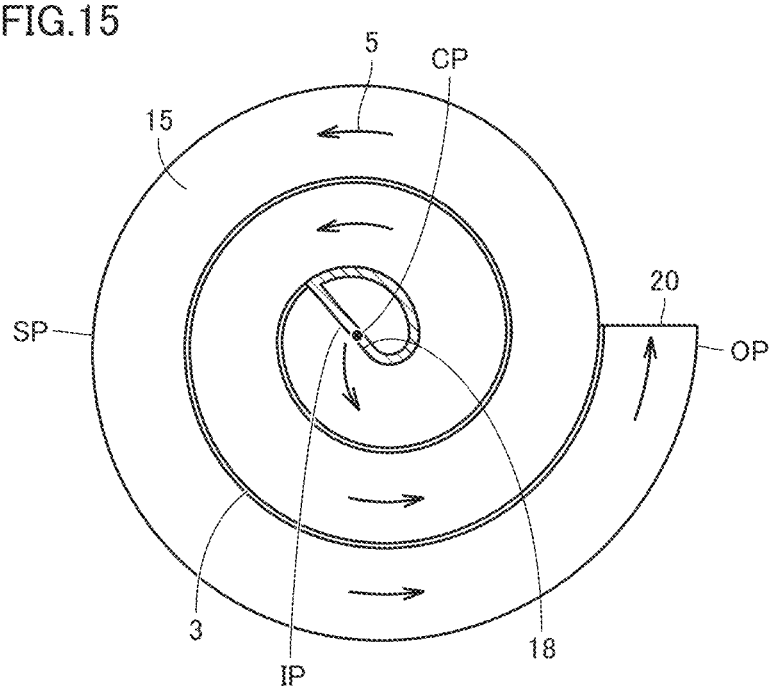
FIG. 15 is a schematic bottom view of a configuration of a second layer of the magnetic heat container according to the fourth embodiment.
Figure 16:
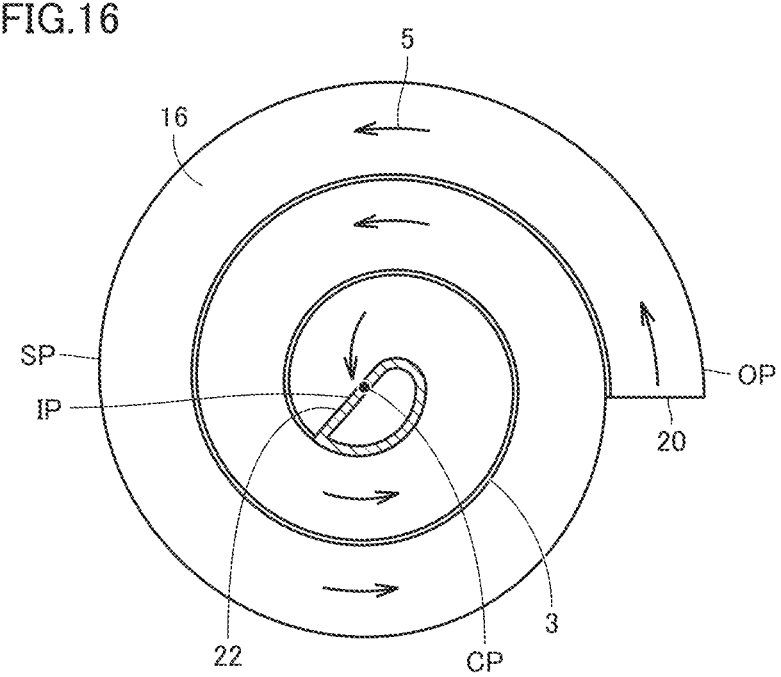
FIG. 16 is a schematic top view of a configuration of a third layer of the magnetic heat container according to the fourth embodiment.
Figure 17:
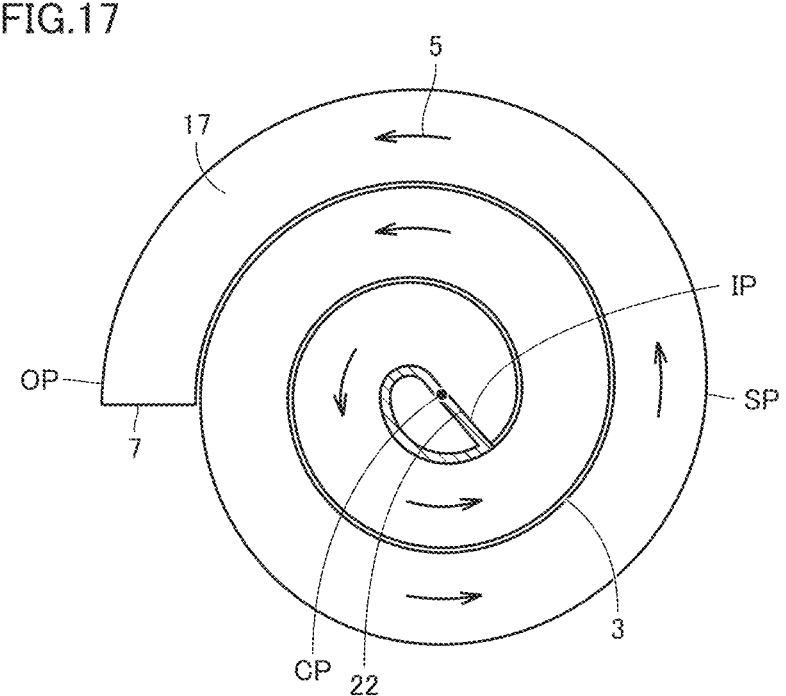
FIG. 17 is a schematic bottom view of a configuration of a fourth layer of the magnetic heat container according to the fourth embodiment.
Figure 18:
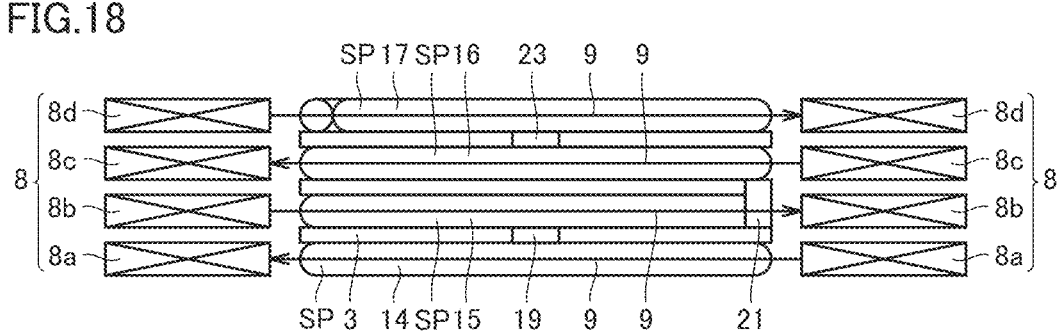
FIG. 18 is a schematic front view of a configuration of the magnetic heat container and a magnetic field generation device according to the fourth embodiment.

With reference to FIGS. 11 to 13, a configuration of magnetic heat container 1 according to the third embodiment will be described.

Magnetic heat container 1 according to the third embodiment has a two-layer structure. Magnetic heat container 1 includes a first layer 14 and a second layer 15. Second layer 15 is laminated on first layer 14. First layer 14 and second layer 15 each have a spiral shape SP. Magnetic heat container 1 is wound in a spiral in one direction on a plane of each layer. One of the ports of each layer of magnetic heat container 1 is positioned at an outer peripheral portion of spiral shape SP. The other of the ports of each layer of magnetic heat container 1 is positioned at an inner peripheral portion of spiral shape SP.

At a center CP of spiral shape SP of magnetic heat container 1, first layer 14 is connected to second layer 15. An inner peripheral portion IP of first layer 14 is connected to an inner peripheral portion IP of adjacent second layer 15 via a connection port 18. Pipe ports (a high temperature-side port 6 and a low temperature-side port 7) of magnetic heat container 1 are each disposed at an outer peripheral portion OP of a corresponding one of first layer 14 and second layer 15. High temperature-side port 6 is disposed at outer peripheral portion OP of first layer 14. Low temperature-side port 7 is disposed at outer peripheral portion OP of second layer 15. High temperature-side port 6 and low temperature-side port 7 are both connected to a heat transport path 10 (see FIG. 6) of magnetic refrigeration device 100.

First layer 14 and second layer 15 each have a heat insulating member 3 disposed between adjacent portions of magnetic heat container 1. As an alternative to heat insulating member 3, magnetic heat container 1 formed of a heat insulating material to have heat insulation may be used.

First layer 14 and second layer 15 are each filled with a magneto-caloric material 2 and a heat transport medium 4. Heat transport medium 4 freely flows in magnetic heat container 1. Magneto-caloric material 2 fills or fixed in magnetic heat container 1 so as not to largely flow due to the flow of heat transport medium 4.

First layer 14 and second layer 15 are laminated. Heat insulating member 3 is disposed between first layer 14 and second layer 15. As an alternative to heat insulating member 3, magnetic heat container 1 formed of a heat insulating material to have heat insulation may be used.

In order to uniformly apply a varying magnetic field to both first layer 14 and second layer 15, magnetic field generation device 8 is disposed to cover, from an outer peripheral side, spiral shape SP of each of first layer 14 and second layer 15. Magnetic field generation device 8 includes a first generator 8a and a second generator 8b. First generator 8a is disposed to cover first layer 14 from the outer peripheral side. Second generator Sb is disposed to cover second layer 15 from the outer peripheral side. Magnetic field 9 applied from magnetic field generation device 8 is uniform inside each of first layer 14 and second layer 15.

In the present embodiment, first generator 8a and second generator 8b are different in magnetic field direction from each other. Specifically, magnetic fields 9 applied to first layer 14 and second layer 15 are opposite in direction to each other. Note that magnetic fields 9 applied to first layer 14 and second layer 15 may be the same in direction. Note that, from the viewpoint of magnetic refrigeration performance, it is desirable that magneto-caloric material 2 in magnetic heat container 1 has the same heat generation timing in its entirety. It is therefore desirable that the intensity of the magnetic field is uniform all over magnetic heat container 1.

Connection port 18 of first layer 14 is connected to connection port 18 of second layer 15 via a connection portion 19. Heat transport medium 4 (see FIG. 6) with which magnetic heat container 1 is filled flows in a direction of a flow 5 of heat transport medium 4 in first layer 14 as illustrated in FIG. 11, and then flows in a direction of flow 5 of heat transport medium 4 in second layer 15 illustrated in FIG. 12.

The operation and effect of magnetic refrigeration device 100 according to the third embodiment will be described.

In magnetic refrigeration device 100 according to the third embodiment, magnetic heat container 1 includes first layer 14 and second layer 15. This allows an increase in length of the flow path of magnetic heat container 1.

In magnetic refrigeration device 100 according to the third embodiment, the pipe ports (high temperature-side port 6 and low temperature-side port 7) of magnetic heat container 1 are each disposed at outer peripheral portion OP of a corresponding one of first layer 14 and second layer 15. This allows the pipe ports (high temperature-side port 6 and low temperature-side port 7) of magnetic heat container 1 to be easily connected to heat transport path 10.

In magnetic refrigeration device 100 according to the third embodiment, magnetic field generation device 8 includes first generator 8a and second generator 8b. First generator 8a is disposed to cover first layer 14 from the outer peripheral side. Second generator 8b is disposed to cover second layer 15 from the outer peripheral side. First generator 8a and second generator 8b are different in magnetic field direction from each other. This allows a different magnetic field to be specified for spiral shape SP of each layer, so that it is easy to use a high magnetic field generation device including, for example, a permanent magnet in Halbach structure.

Fourth Embodiment

A magnetic heat container 1 and a magnetic refrigeration device 100 according to a fourth embodiment are the same in configuration, operation, and effect as magnetic heat container 1 and magnetic refrigeration device 100 according to the third embodiment unless otherwise specified. Magnetic heat container 1 according to the fourth embodiment is larger in the number of layers than magnetic heat container 1 according to the third embodiment.

With reference to FIGS. 14 to 18, a configuration of magnetic heat container 1 according to the fourth embodiment will be described.

Magnetic heat container 1 according to the fourth embodiment has a four-layer structure. Magnetic heat container 1 includes a first layer 14, a second layer 15, a third layer 16, and a fourth layer 17. Second layer 15 is laminated on first layer 14. Third layer 16 is laminated on second layer 15. Fourth layer 17 is laminated on third layer 16. First layer 14, second layer 15, third layer 16, and fourth layer 17 each have a spiral shape SP.

A connection port 18 provided at an inner peripheral portion IP of first layer 14 is connected to a connection port 18 provided at an inner peripheral portion IP of second layer 15 via a connection portion 19. A connection port 20 provided at an outer peripheral portion OP of second layer 15 is connected to a connection port 20 provided at an outer peripheral portion OP of third layer 16 via a connection portion 21. A connection port 22 provided at an inner peripheral portion IP of third layer 16 is connected to a connection port 22 provided at an inner peripheral portion IP of fourth layer 17 via a connection portion 23.

Second layer 15, third layer 16, and fourth layer 17 are each formed in a shape obtained by rotating or inverting first layer 14. Laminating first layer 14, second layer 15, third layer 16, and fourth layer 17 makes it possible to produce magnetic heat container 1 having any number of layers.

The operation and effect of magnetic refrigeration device 100 according to the fourth embodiment will be described.

In magnetic refrigeration device 100 according to the fourth embodiment, magnetic heat container 1 includes first layer 14, second layer 15, third layer 16, and fourth layer 17. This allows a further increase in length of the flow path of magnetic heat container 1.

Fifth Embodiment

A magnetic heat container 1 and a magnetic refrigeration device 100 according to a fifth embodiment are the same in configuration, operation, and effect as magnetic heat container 1 and magnetic refrigeration device 100 according to the first embodiment unless otherwise specified.

Figure 19:
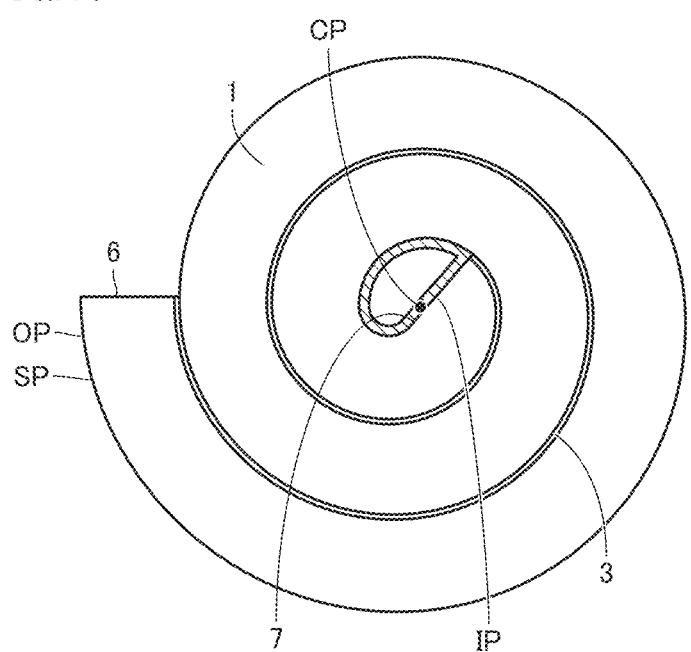
FIG. 19 is a schematic plan view of a configuration of a magnetic heat container according to a fifth embodiment.

With reference to FIG. 19, a configuration of magnetic heat container 1 according to the fifth embodiment will be described.

Magnetic heat container 1 has a spiral shape SP wound in one direction on a plane. A high temperature-side port 6 is provided at an outer peripheral portion OP of magnetic heat container 1. A low temperature-side port 7 is provided at an inner peripheral portion IP of magnetic heat container 1.

Figure 20:
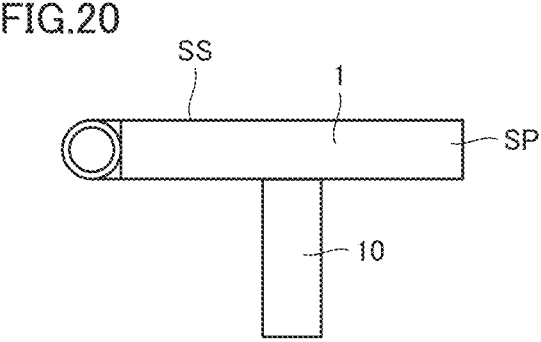
FIG. 20 is a schematic front view of a configuration of the magnetic heat container and a part of a heat transport path according to the fifth embodiment.

With reference to FIG. 20, a configuration of magnetic heat container 1 and a heat transport path 10 according to the fifth embodiment will be described. At a center of spiral shape SP, low temperature-side port 7 of magnetic heat container 1 is connected to heat transport path 10. Heat transport path 10 has a shape extending in the axial direction of spiral shape SP.

Figure 21:
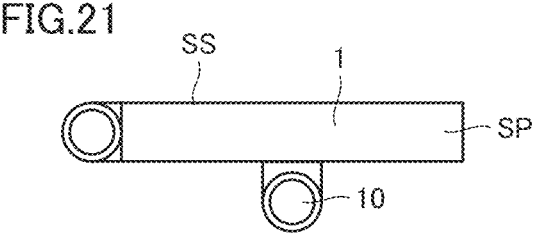
FIG. 21 is a schematic front view of a configuration of a modification of the magnetic heat container and the part of the heat transport path according to the fifth embodiment.

With reference to FIG. 21, a configuration of a modification of magnetic heat container 1 and heat transport path 10 according to the fifth embodiment will be described. Heat transport path 10 has a shape extending in the axial direction of spiral shape SP of magnetic heat container 1 and then extending on a plane different from spiral surface SS in a direction parallel to spiral surface SS.

Figure 22:
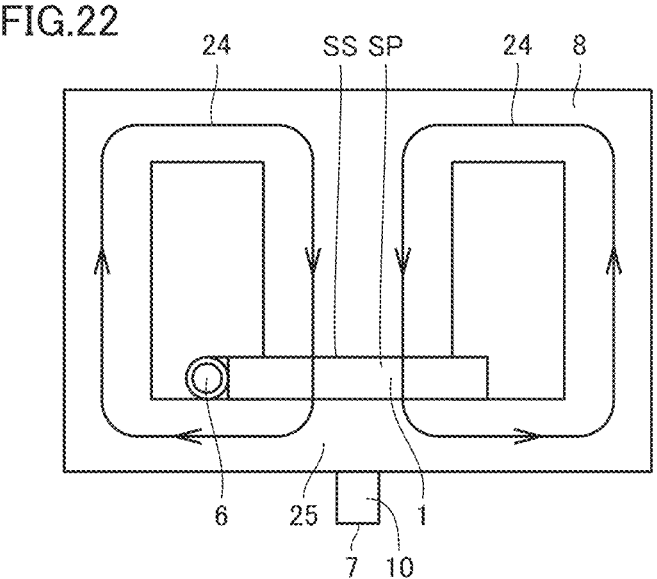
FIG. 22 is a schematic front view of a configuration of the magnetic heat container, the part of the heat transport path, and a magnetic field generation device according to the fifth embodiment.
Figure 23:
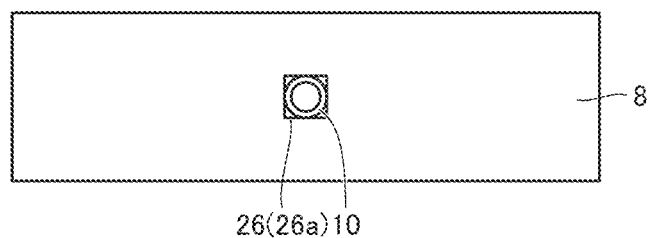
FIG. 23 is a schematic bottom view of the configuration of the magnetic heat container, the part of the heat transport path, and the magnetic field generation device according to the fifth embodiment.

With reference to FIGS. 22 and 23, a configuration of magnetic heat container 1, a part of heat transport path 10, and a magnetic field generation device 8 according to the fifth embodiment will be described.

Magnetic field generation device 8 applies a magnetic field to magnetic heat container 1 in a direction orthogonal to spiral surface SS of spiral shape SP illustrated in FIG. 20. On one side of magnetic field generation device 8 facing spiral surface SS on one side of spiral shape SP, a magnetic path 24 is a unidirectional path. Magnetic path 24 branches off on the other side of magnetic field generation device 8 facing spiral surface SS on the other side of spiral shape SP. Directions of magnetic path 24 that has branched off are different from each other by 180 degrees. Magnetic path 24 that has branched off passes through magnetic field generation device 8, goes around the outside of magnetic heat container 1 to the opposite side of spiral shape SP, and then joins to form unidirectional magnetic path 24. Accordingly, a closed magnetic path 24 is formed in which magnetic path 24 is incident perpendicularly on spiral surface SS on one side of spiral shape SP again.

Magnetic field generation device 8 may include a permanent magnet, a yoke, an electromagnet, a superconducting magnet, or the like.

Magnetic field generation device 8 includes a branch portion 25 that causes magnetic path 24 to branch off. Branch portion 25 is provided with a space 26. Space 26 is a hole. Heat transport path 10 is drawn out of magnetic field generation device 8 through space 26. This causes the heat transport medium to be transported through space 26.

Branch portion 25 in magnetic field generation device 8 is low in utilization of magnetic field generation device 8. Therefore, even when a part of branch portion 25 is removed to form space 26, deterioration in performance of magnetic field generation device 8 is suppressed.

Figure 24:
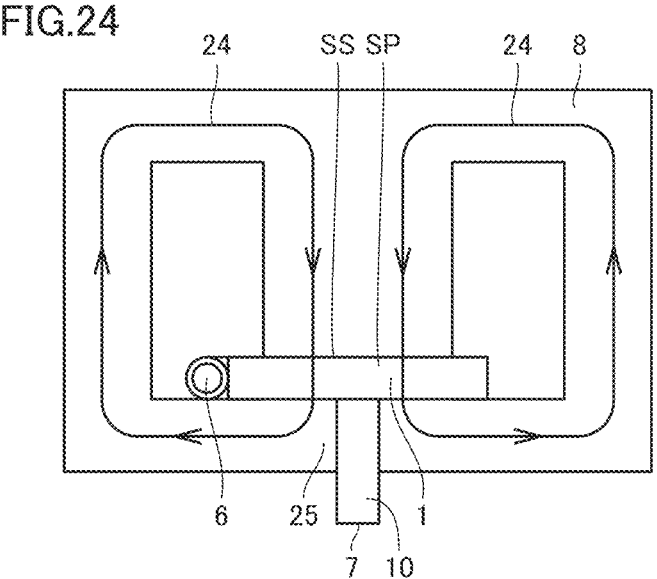
FIG. 24 is a schematic front view of a configuration of a first modification of the magnetic heat container, the part of the heat transport path, and the magnetic field generation device according to the fifth embodiment.
Figure 25:
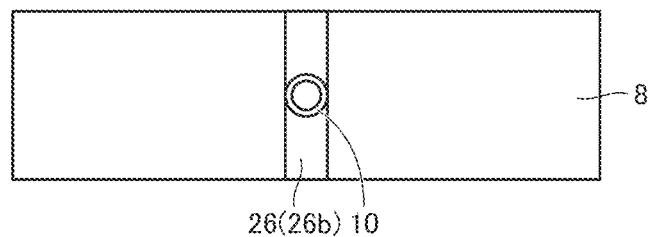
FIG. 25 is a schematic bottom view of the configuration of the first modification of the magnetic heat container, the part of the heat transport path, and the magnetic field generation device according to the fifth embodiment.

With reference to FIGS. 24 and 25, a configuration of a first modification of magnetic heat container 1, the part of heat transport path 10, and magnetic field generation device 8 according to the fifth embodiment will be described.

In the first modification, magnetic heat container 1 illustrated in FIG. 20 is used. Space 26 of magnetic field generation device 8 is a gap 26$b$. Since space 26 is gap 26$b$, it is easy to relatively move magnetic heat container 1 and magnetic field generation device 8.

Figure 26:
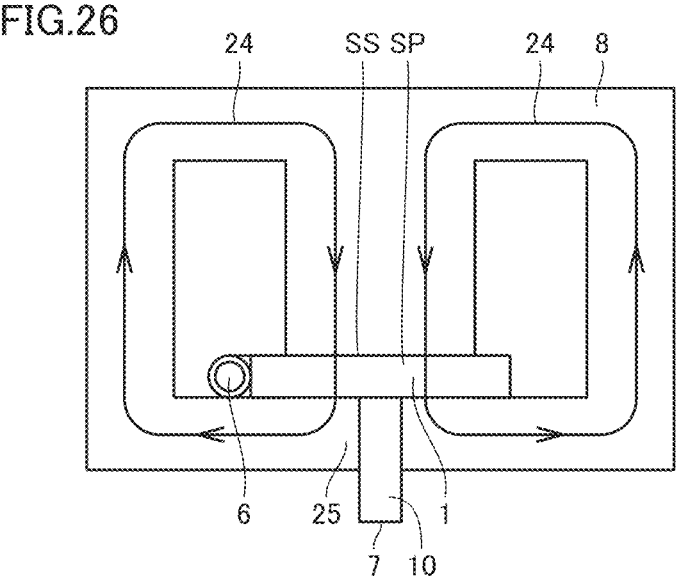
FIG. 26 is a schematic front view of a configuration of a second modification of the magnetic heat container, the part of the heat transport path, and the magnetic field generation device according to the fifth embodiment.
Figure 27:
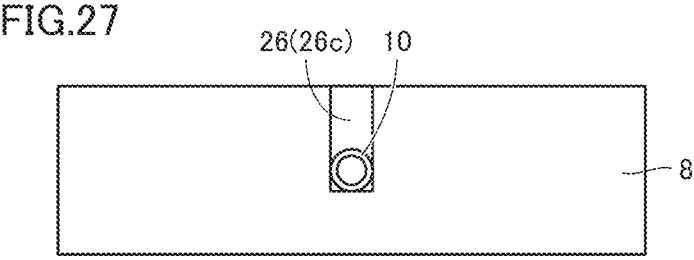
FIG. 27 is a schematic bottom view of the configuration of the second modification of the magnetic heat container, the part of the heat transport path, and the magnetic field generation device according to the fifth embodiment.

With reference to FIGS. 26 and 27, a configuration of a second modification of magnetic heat container 1, the part of heat transport path 10, and magnetic field generation device 8 according to the fifth embodiment will be described.

In the second modification, magnetic heat container 1 illustrated in FIG. 20 is used. Space 26 of magnetic field generation device 8 is a slit 26$c$. Since space 26 is slit 26$c$, it is easy to relatively move magnetic heat container 1 and magnetic field generation device 8.

Figure 28:
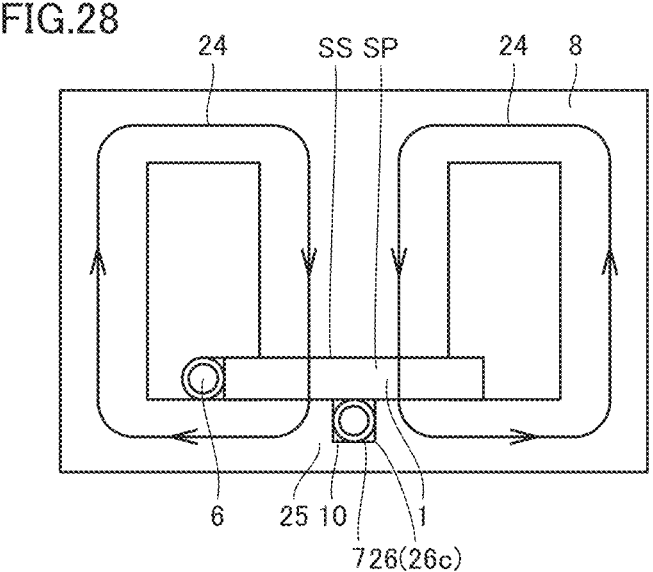
FIG. 28 is a schematic front view of a configuration of a third modification of the magnetic heat container, the part of the heat transport path, and the magnetic field generation device according to the fifth embodiment.
Figure 29:
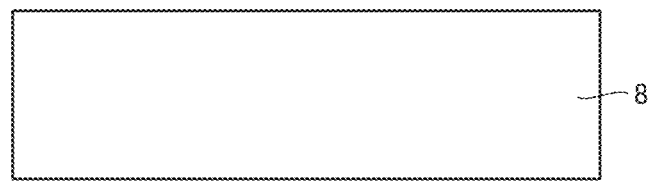
FIG. 29 is a schematic bottom view of the configuration of the third modification of the magnetic heat container, the part of the heat transport path, and the magnetic field generation device according to the fifth embodiment.

With reference to FIGS. 28 and 29, a configuration of a third modification of magnetic heat container 1, the part of heat transport path 10, and magnetic field generation device 8 according to the fifth embodiment will be described.

In the third modification, magnetic heat container 1 illustrated in FIG. 21 is used. Space 26 of magnetic field generation device 8 is a slit 26$c$. Since space 26 is slit 26$c$, it is easy to relatively move magnetic heat container 1 and magnetic field generation device 8.

The operation and effect of magnetic refrigeration device 100 according to the fifth embodiment will be described.

In magnetic refrigeration device 100 according to the fifth embodiment, space 26 is provided in branch portion 25 of magnetic field generation device 8, and the heat transport medium is transported through space 26. Therefore, even when a part of magnetic field generation device 8 that is low in magnetic utilization is removed to form space 26 in order to draw out heat transport path 10 from the center of the spiral shape, heat transport path 10 can be drawn out to transport the heat transport medium while suppressing deterioration in performance of magnetic field generation device 8.

Further, the above-described embodiments may be combined as desired.

It should be understood that the embodiments disclosed herein are illustrative in all respects and not restrictive. The scope of the present disclosure is defined by the claims rather than the above description, and the present disclosure is intended to include the claims, equivalents of the claims, and all modifications within the scope.

REFERENCE SIGNS LIST

1: magnetic heat container,
2: magneto-caloric material,
3: heat insulating member,
4: heat transport medium,
6: high temperature-side port,
7: low temperature-side port,
8: magnetic field generation device,
8$a$: first generator,
8$b$: second generator,
10: heat transport path,
11: high temperature-side heat exchanger,
12: low temperature-side heat exchanger,
13: pump,
14: first layer,
15: second layer,
16: third layer,
17: fourth layer,
24: magnetic path,
25: branch portion,
26: space,
100: magnetic refrigeration device,
CP: center,
D1: first dimension,
D2: second dimension,
IP: inner peripheral portion,
OP: outer peripheral portion,
S1: first spiral portion,
S2: second spiral portion,
SP: spiral shape,
SS: spiral surface,
X: axial direction,
Y: direction orthogonal to axial direction

The invention claimed is:

1. A magnetic refrigeration device comprising:
 a magnetic heat container filled with a magneto-caloric material;
 a magnetic field generation device configured to vary a magnetic field applied to the magnetic heat container filled with the magneto-caloric material;
 a high temperature-side heat exchanger connected to the magnetic heat container;
 a low temperature-side heat exchanger connected to the magnetic heat container to place the magnetic heat container between the high temperature-side heat exchanger and the low temperature-side heat exchanger; and
 a reciprocating pump configured to transport a heat transport medium in a reciprocable manner between the high temperature-side heat exchanger and the low temperature-side heat exchanger via the magnetic heat container, wherein the magnetic heat container has a spiral shape extending in a spiral whose coils are disposed on an identical plane and allows the heat transport medium transported by the reciprocating pump to flow along the spiral shape, the magnetic heat container has a first dimension in an axial direction of the spiral shape and a second dimension in a direction orthogonal to the axial direction, and the first dimension is greater than the second dimension.

2. The magnetic refrigeration device according to claim 1, further comprising a heat insulating member disposed between adjacent portions of the spiral shape.

3. The magnetic refrigeration device according to claim 1, wherein adjacent portions of the spiral shape are formed of a heat insulating material.

4. The magnetic refrigeration device according to claim 1, wherein the spiral shape includes a first spiral portion to extend in a spiral from an outer periphery of the spiral shape to a center of the spiral shape and a second spiral portion to extend in a spiral from the center of the spiral shape to the outer periphery of the spiral shape, wherein the second spiral portion extends in a spiral in a direction opposite to a direction of the first spiral portion.

5. The magnetic refrigeration device according to claim 1, wherein the magnetic field generation device applies a magnetic field to the magnetic heat container in a direction parallel or orthogonal to a spiral surface of the magnetic heat container.

6. The magnetic refrigeration device according to claim 1, wherein a port of the high temperature-side heat exchanger and a port of the low temperature-side heat exchanger are on opposite sides of the spiral shape of the magnetic heat exchanger.

7. The magnetic refrigeration device according to claim 6, wherein the heat transport medium flows into the port of the low temperature-side heat exchanger and out of the port of the high temperature-side heat exchanger.

8. The magnetic refrigeration device according to claim 1, wherein the spiral shape is a circular spiral shape.

9. The magnetic refrigeration device according to claim 1, wherein the spiral shape is a quadrangular spiral shape.

* * * * *